United States Patent [19]
Emery et al.

[11] 3,817,132
[45] June 18, 1974

[54] MACHINES FOR STRIPPING INSULATION FROM CABLES

[76] Inventors: Manning Emery, 163 Main St., Yarmouth, Maine 04106; Ronald L. Vacchiano, Box 402, North Windham, Maine 04101

[22] Filed: Mar. 3, 1972

[21] Appl. No.: 231,704

[52] U.S. Cl.................. 83/105, 83/121, 83/433, 83/924, 81/9.51
[51] Int. Cl............................................. H02g 1/12
[58] Field of Search....... 81/9.51; 83/924, 105, 407, 83/433, 444, 121

[56] References Cited
UNITED STATES PATENTS

| | | | |
|---|---|---|---|
| 3,175,430 | 3/1965 | Smith et al.......................... | 81/9.51 |
| 3,631,748 | 1/1972 | Kuts.................................... | 81/9.51 |

*Primary Examiner*—Al Lawrence Smith
*Assistant Examiner*—Roscoe V. Parker

[57] ABSTRACT

A machine is disclosed for stripping the insulation lengthwise from cables. The machine has a pair of cutters spaced apart with their cutting edges in a first plane and rotatably supported by adjustable means operable to move them equally towards and away from each other. The machine also has a cable feed including cable-gripping means at each side of said plane and provided with adjustable means operable to move the cable-gripping means equally towards and away from each other in a plane intersecting the first named plane at right angles midway between the cutters. The adjustable means for the cutters are independent of the adjustable means for the cable-gripping means.

21 Claims, 10 Drawing Figures

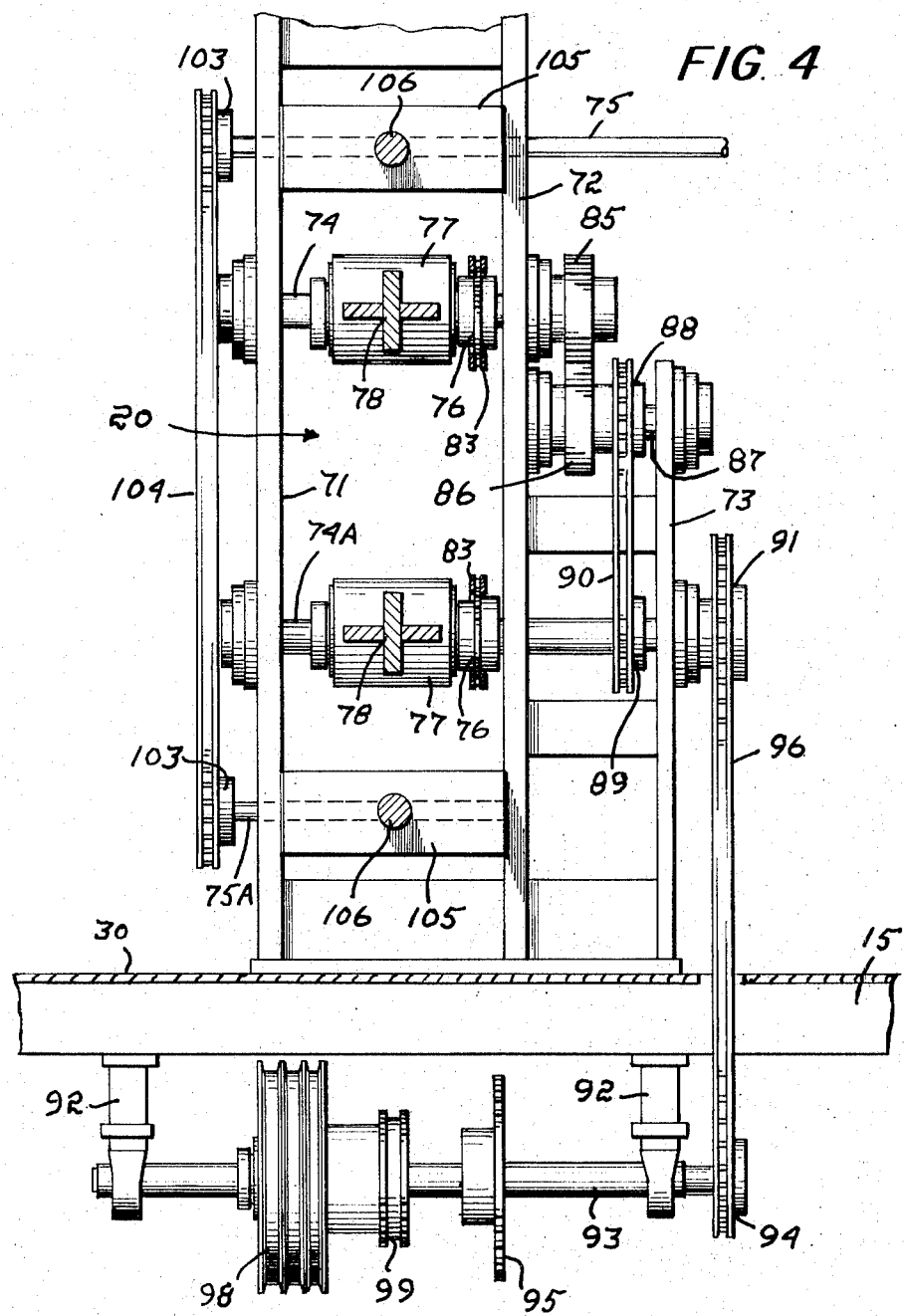

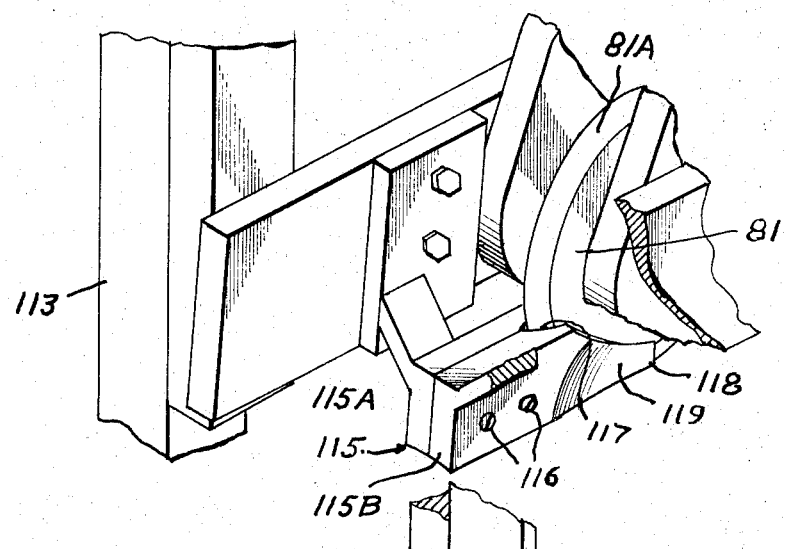
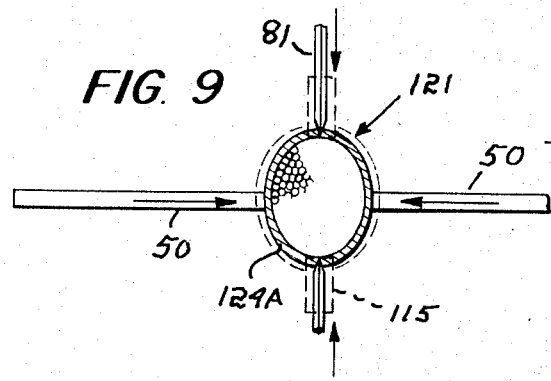
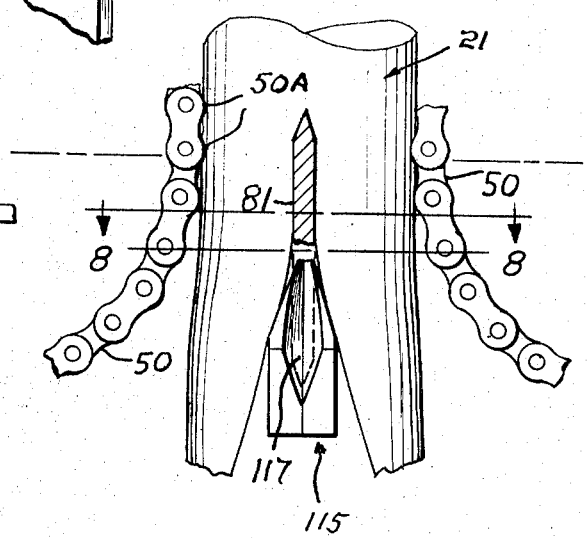
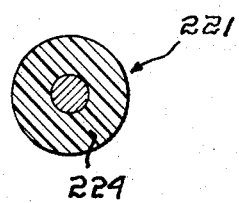
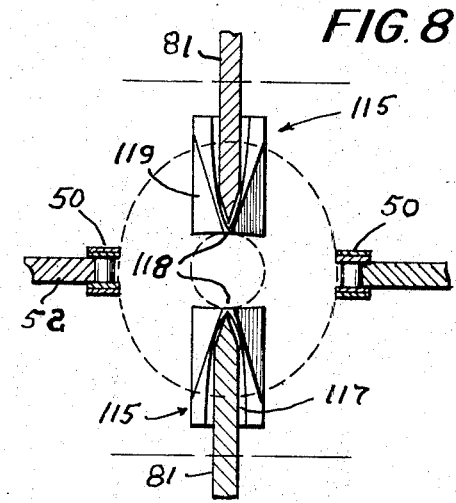

MACHINES FOR STRIPPING INSULATION FROM CABLES

BACKGROUND OF THE INVENTION

The term "cable stripping" is used both to describe the removal of insulation from a selected portion or portions of a cable as required for electrical connections and the removal of the insulation from the entire length of a cable, either to remove defective sheathing or as a necessary part of a salvage operation. The former entails the cutting of the insulation transversely of the cable while the latter requires that the insulation be cut lengthwise thereof. The present invention relates to the latter type of operation.

Machines are available for stripping the insulation from cables, but these have not met all requirements where the cables are large or where cables varying substantially in diameter must be processed.

The problems encountered in removing the insulation from cables result from the different types of cores and the different types of insulations therefor. Not only do insulations differ in thickness and kind with the same outside cable dimensions but also some insulations, lead and certain plastics, for example, are harder to remove than the others, particularly with cores having a plurality of strands. These factors are increasingly troublesome when cables whose diameter differ substantially are to be processed and also when the cable diameters are large. The larger the cable, the more difficult it is to ensure that the cable is fed properly to the cutters.

Machines of the type disclosed in U.S. Pat. No. 3,176,549 function satisfactorily where the cables are small, and hence do not require separate feeding means, and are of generally the same type and without too great a variation in their diameters.

Machines of the type disclosed in U.S. Pat. No. 2,434,640 are capable of removing insulation from cables in a satisfactory size range and although the cutters were adjustable to various insulation thicknesses, they severed the insulation by means of a pair of cuts tangentially to the cores of the cables, with the cutters being necessary to the feeding of the cable. In use, the introduction of a cable length into the machines was difficult.

In U.S. Pat. No. 3,316,781, a machine is disclosed providing two pairs of cable-gripping chains as the cable feed, desirable for large size cables, with a cutter between the chains of each pair and at their infeed ends but with no provision made for enabling the depth of their cuts to be varied.

THE PRESENT INVENTION

The present invention has for its objectives machines that are adapted to meet all the requirements for stripping insulation lengthwise from cables through a larger range of cable sizes than has hitherto been possible regardless of the type and thickness of the insulation.

Such a machine has a pair of cutting members supported by adjustable means operable to move equally with their cutting edges in a plane towards or away from each other and a cable feed including cable-gripping means at each side of said plane and provided with adjustable means operable to move the cable-gripping means equally towards or away from each other in a plane intersecting at right angles the midpoint of the plane of the cutting members. The adjustable means for the cutting member are, for most purposes, independent of the adjustable means for the cable-gripping means and the cutting members include splitting means.

The cable-gripping means of the cable feed are chains and the cutting members are located to engage the cable near their outfeed ends. The cable-gripping means are mounted on carriages with their adjustable means providing for chains being positively held in their adjusted position, enabling the grip of the chains on the cable to be varied as required for the proper operation of the machine with the particular cable then being processed.

The adjustable means for the cutting members enable their position to be selected and established in relation to the diameter of the particular cable being processed and the thickness of its insulation. For most purposes the cutting members are rotatable cutters and splitting shoes are provided, one for each cutter and supported by its adjustable means with its point positioned close to the cutter on its outfeed side and with the shoe positioned to ride on the core of the cable.

THE PREFERRED EMBODIMENT OF THE INVENTION

In the accompanying drawings, a preferred embodiment of the invention is shown in which -

FIG. 4 is a section taken approximately along the indicated lines 4—4 of FIG. 2;

FIG. 6 is a fragmentary perspective view showing one of the cutters and its splitting shoe;

FIG. 7 is a schematic plan view illustrating the preferred relationship of the cutters and stripping shoe to the cable-gripping chains;

FIG. 8 is a like view showing their relationship in cross section;

FIG. 9 is a view illustrating schematically the compressive action of the cable-gripping chains on a telephone cable; and FIG. 10 is a cross section of another type of cable.

Figure 1:
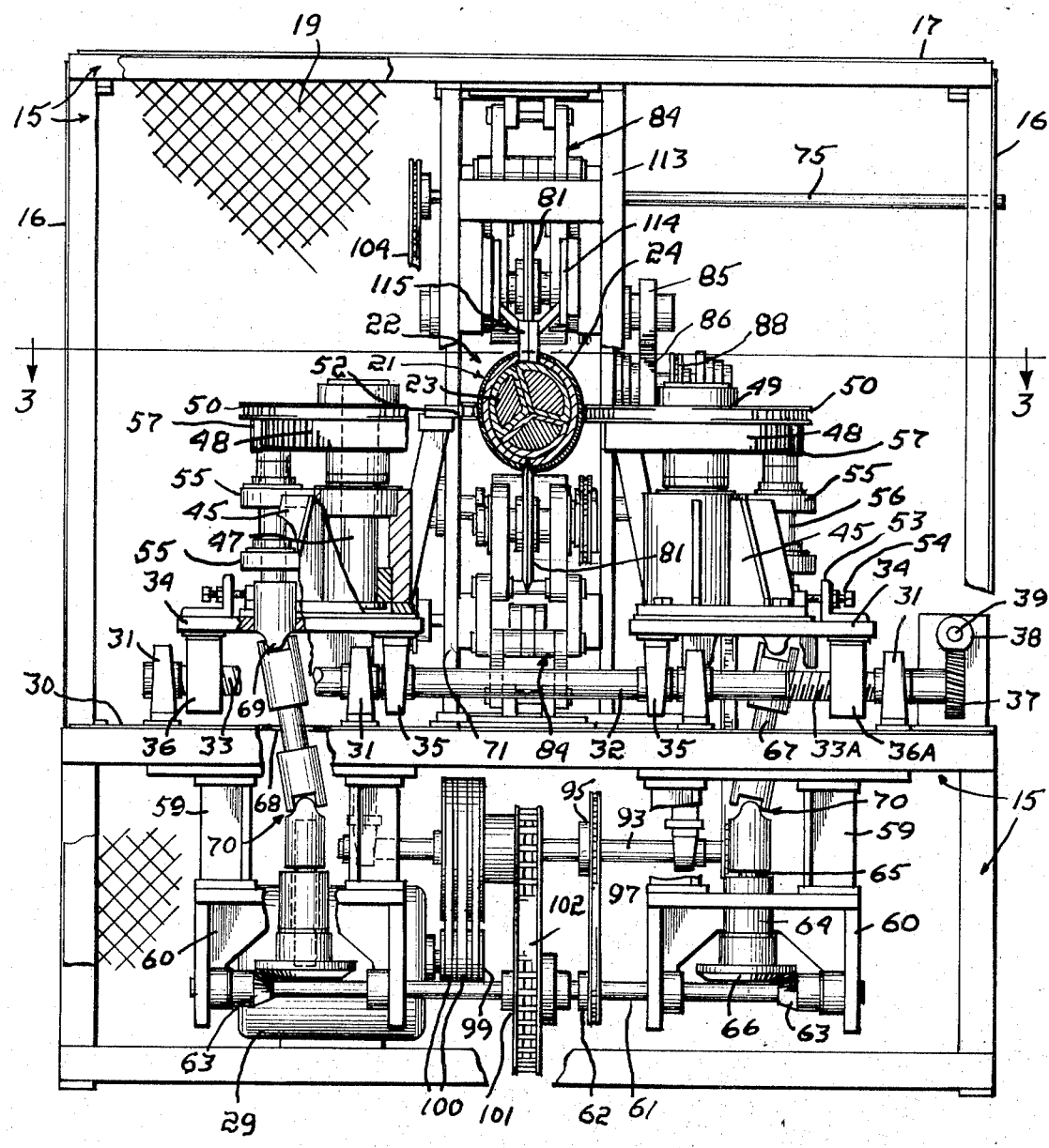
FIG. 1 is a partly sectioned, partly broken away view of a wire stripper as seen from its outfeed or rear end.

The machine illustrated by the drawings has a framework, generally indicated at 15, enclosed by side, top, front or infeed and rear or outfeed end walls 16, 17, 18, and 19, respectively, each of a coarse, metal meshwork permitting the operation of the machine to be readily observed but blocking manual access except through the infeed port 20 in the front wall 18 for the cable 21 or the outfeed port 22 in the rear wall 19 through which its core 23 and the severed sections of its insulation 24 are delivered.

Figure 2:
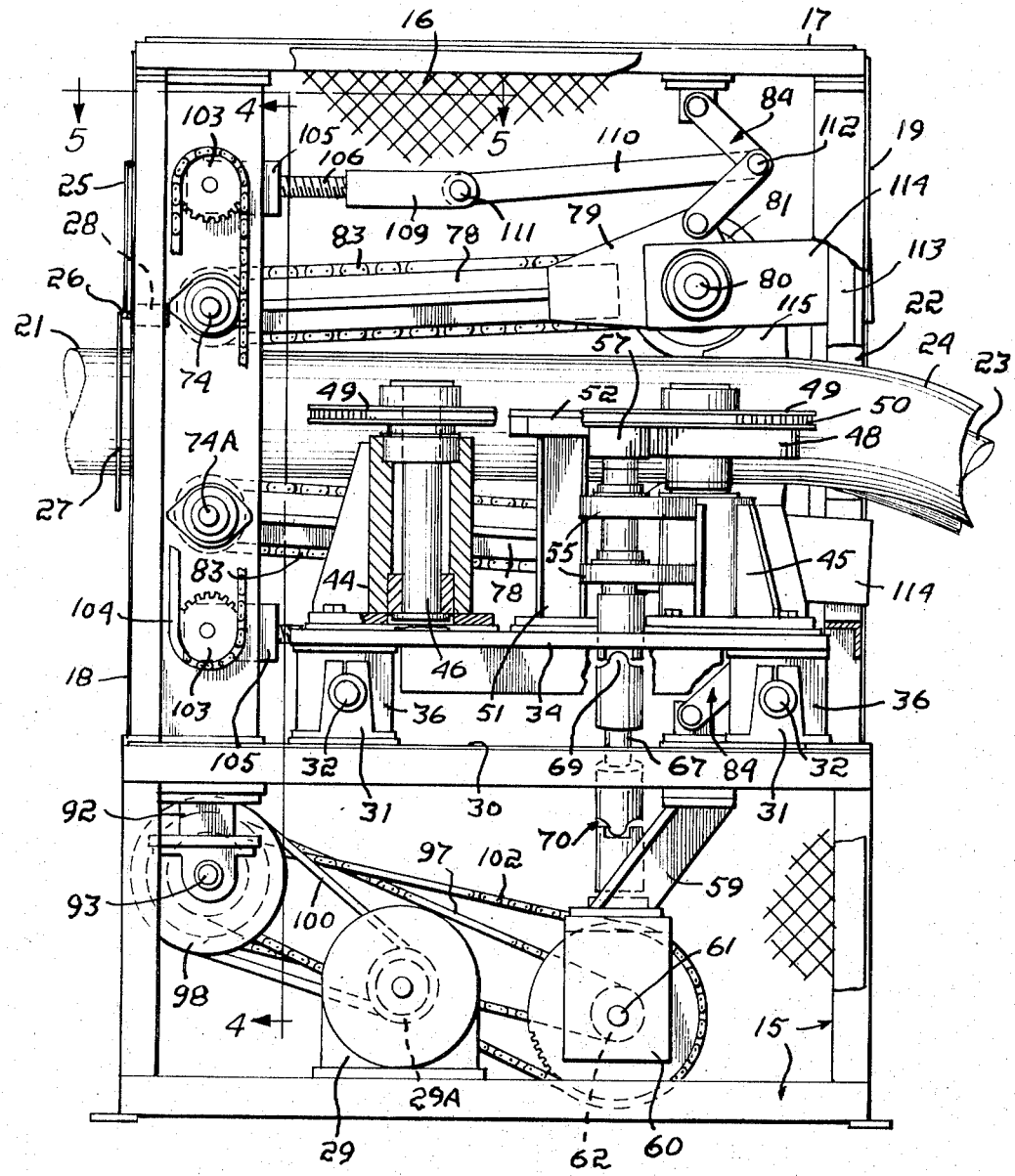
FIG. 2 is a partly sectioned and partly broken away side view thereof.

As there is always the chance that an operator will be caught or have his clothing caught by the machine, its infeed wall 18 has, see FIG. 2, a hanger 25 pivotally connected thereto above the port 20 and provided with a transverse hinge pin 26 in support of a guard 27 extending downwardly at both sides of the infeed port 20.

The guard 27 is backed by the stem of a normally closed switch 28 in the circuit of the motor 29 mounted on the base of the framework 15. Should the person or the clothing of an operator be caught, during the operation of the machine, at the infeed end thereof, he would be pulled against the infeed wall 18 and into engagement with the guard 27 with the resulting force opening the switch 28 until the operator was freed.

The machine, as previously stated, includes two principle components (1) cutting means to slit the cable C lengthwise thereof and (2) a cable feed including cable-gripping means to grip the cable C between them and advance it relative to the cutting means.

The cable feed will first be detailed and it will be noted that the frame work 15 supports a floor 30 spaced above the motor 29 and provided with supports 31 in which are journalled a pair of parallel, transverse shafts 32 spaced from each other lengthwise of the machine. Each shaft 32 is shown as provided with spaced, oppositely threaded portions 33 and 33A, see FIG. 1. Each of a pair of transversely spaced carriages 34 has depending supports 35 and one has additional depending supports 36 and the other similar supports 36A. The supports 35 are slidable on the shafts 32 and the supports 36 and 36A are threaded appropriately to receive the threaded portions 33 and 33A, respectively, of the shafts 32. It will be apparent that by turning the shafts 32 in one direction or the other, the carriages 34 are moved equally towards or away from each other. In order that both shafts 32 may be turned together, a corresponding end of each of them is provided with a worm gear 37 in mesh with an appropriate one of the worms 38 on a shaft 39 extending lengthwise of the machine at one side thereof as may best be seen in FIG. 3. While the shaft 39 may be turned manually, it is shown as having a sprocket 40 at one end connected to the sprocket 41 of a motor 42 by a chain 43, the motor 42 being manually controlled to effect the desired spacing of the carriages 34.

Each carriage 34 has mounts 44 and 45 spaced lengthwise of each other and connected thereto by bolts 34A extending through transverse slots 34B. The mounts 44 and 45 support vertically disposed shafts 46 and 47, respectively, with each of the shafts 47 provided with a gear 48 and both shafts of both carriages having sprockets 49 fast on their upper ends. The cable-gripping means are chains 50 trained about the sprockets 49 with the typical chain link including end portions 50A that so protrude as to usually make it unnecessary to provide the chains with special gripping teeth. Each carriage 34 is also provided with a support 51 for a chain-backing shoe 52. The distance that the chains 50 may be moved towards and away from each other determines the size range of cables that the machine may accommodate. The chains 50 receive the cable 21 between them and the carriages 34 are spaced so that the received cable 21 is so tightly gripped to insure that it is properly advanced. As a cable length passes between the chains 50, it is straightened if its curve is in the plane established by the chains 50. Each carriage 34 is also provided with a bracket 53 through which is threaded a set screw 54 as a convenience in spacing the mounts 44 which usually are spaced slightly farther apart than the mounts 45 to faciliate entry of the cable 21 between the chains 50.

Each mount 45 has supports 55 in which a vertical shaft 56 is journalled. Each shaft 56 is provided with a gear 57 in mesh with the appropriate gear 48 and extends freely downwardly through a port 58 in the appropriate one of the carriages 34. On the undersurface of the floor 21, see FIG. 1, there are hangers 59 for U-shaped brackets 60, one bracket 60 for each carriage 34. Both end walls of the brackets 60 rotatably support a transverse shaft 61 having a bevel gear 63 within each bracket 60 and a drive sprocket 62 between them. Centrally of each bracket 60 is a bushing 64 in support of a vertical shaft 65 having a bevel gear 66 on its lower end in mesh with the appropriate one of the gears 63. An intermediate shaft 67 extends freely through a port 68 in the floor 30 and is connected to the shafts 56 and 65 by universal joints 69 and 70, respectively, thus enabling the carriages 34 to be spaced apart as required by the diameter of the cable 21 then being processed to insure the proper engagement of the chains 50 therewith Turning now to the cutting members, it will be noted that adjacent the wall 18, a pair of transversely spaced and centrally located uprights 71 and 72, see FIG. 4, interconnect the floor and top wall framework, one upright on each side of the cable-receiving port 20. In addition, a vertical support 73 is connected to the upright 72. Upper and lower pairs of transverse shafts are provided, one pair, the shafts 74 and 75 above the port 20 and the lower pair of shafts 74A and 75A below that port.

The shaft 74 is journalled in the uprights 71 and 72 and the shaft 74A is journalled in the upright 71 and the support 73. Each of the shafts 74 and 74A is provided with a sprocket 76 and a hub 77 provided with an arm 78, see also FIGS. 2 and 3, lengthwise of the path of the cable 21 being advanced by the chains 50. Each arm 78 has a fork 79 in which the transverse shaft 80 of a circular cutter 81 is journalled with one shaft end exposed and provided with sprocket 82 connected to the appropriate sprocket 76 by a chain 83. The forks 79 of the upper and lower cutters 81 are connected to the top framework and the floor framework 30, respectively, by toggle joints 84.

The shaft 74 has a gear 85 meshing with a gear 86 on a shaft 87 journalled in the uprights 72 and 73 and the shaft 87 and the shaft 74A have sprockets 88 and 89, respectively, interconnected by a chain 90. The shaft 74A is also provided with a sprocket 91 on its exposed end.

Hangers 92, connected to the framework for the floor 30, have a transverse shaft 93 journalled therein. The shaft 93 is provided with sprockets 94 and 95 and the sprockets 91 and 94 are interconnected by a chain 96. It is desirable that the chains 50 and the cutters 81 be driven by the motor 29, and accordingly, the sprockets 95 and 62 are interconnected by a chain 97. A pulley 98 and a sprocket 99 are mounted on the shaft 93 for rotation together independently thereof with the pulley 98 connected to the drive pulley 29A of the motor 29 by belts 100 and the sprocket 99 connected to a second sprocket 101 on the shaft 61 by a chain 102.

Figure 5:
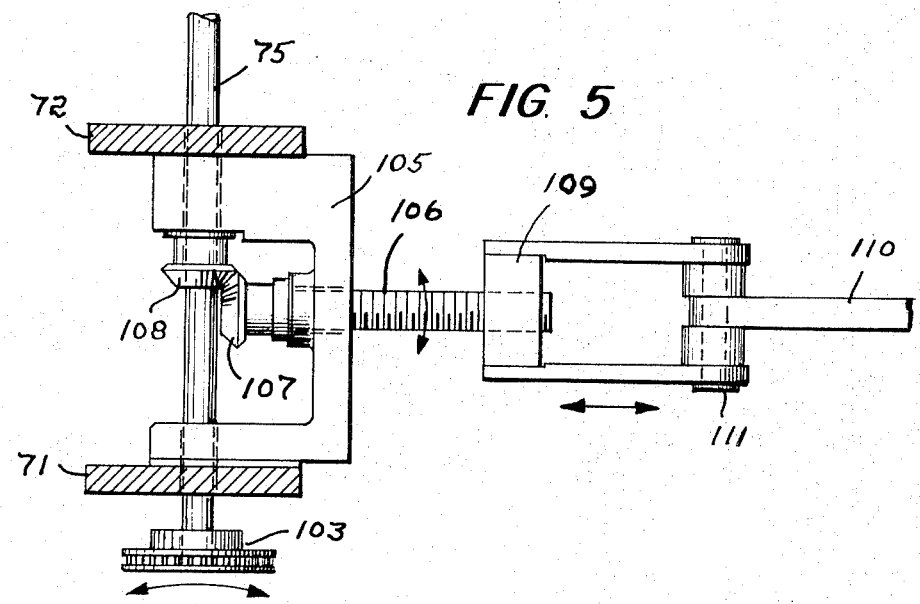
FIG. 5 is a section, on an increase in scale, taken approximately along the indicated lines 5—5 of FIG. 2.

The shafts 75 and 75A are rotatably supported by the uprights 71 and 72 and extend through the upright 71 and each has a sprocket 103 on an exposed end interconnected by a chain 104. Each of the shafts 75, 75A, see FIGS. 4 and 5, passes through the arms of a U-shaped mount 105 secured to the uprights 71 and 72. Each mount 105 rotatably supports a shaft 106 having a bevel gear 107 in mesh with a like gear 108 on the appropriate one of the shafts 75, 75A. Each shaft 106 has an end threaded into a yoke 109 to which an arm 110 is connected by a pivot 111. Each arm 110 is connected to the central pivot 112 of the appropriate one of the toggle joints 84. With this construction, by turning the shaft 75, as by means of a detachable crank, not shown, in one direction or the other, both cutters 81 are moved in a vertical plane equally in opposite directions and are securely held in their set positions to ensure the desired depth of their cuts.

Figure 3:
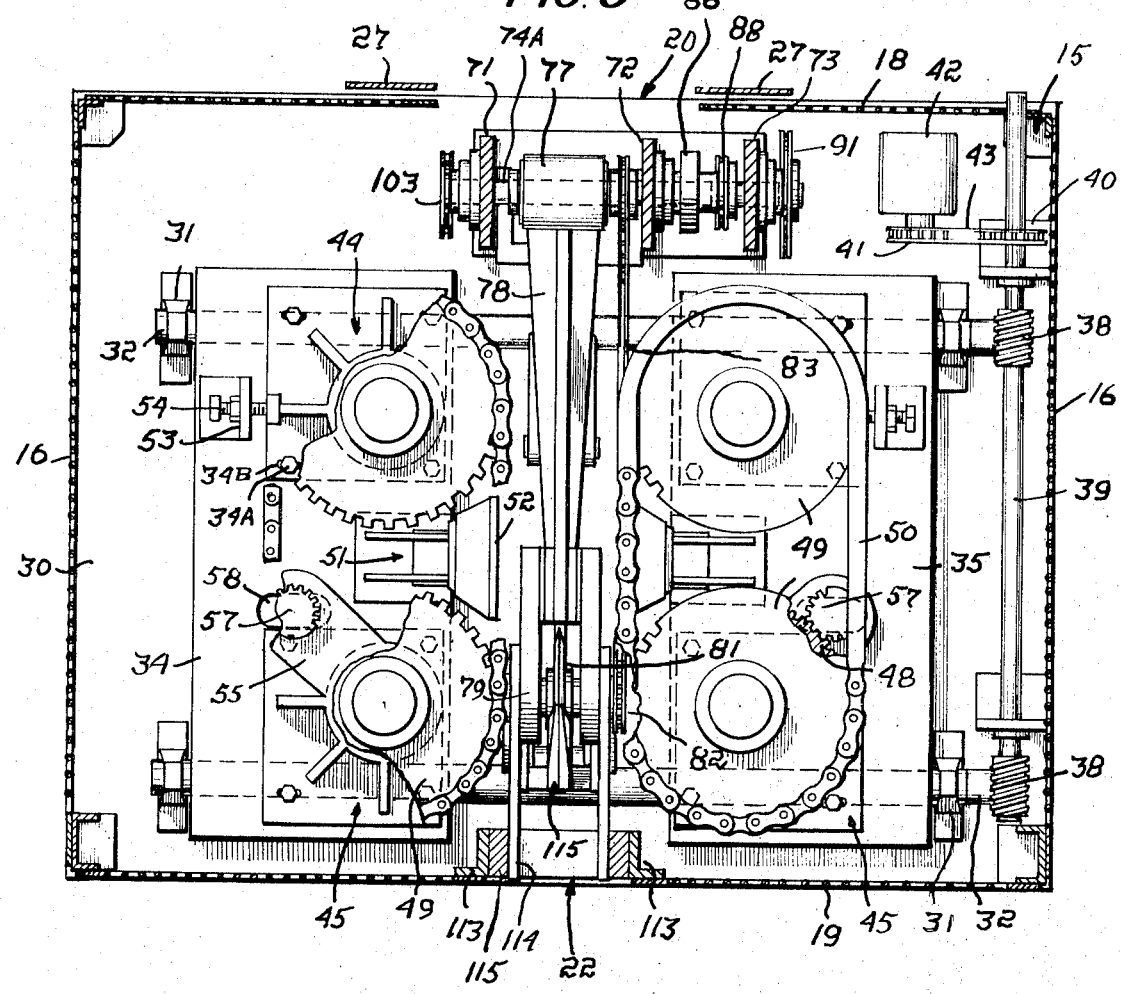
FIG. 3 is a section taken approximately along the indicated lines 3—3 of FIG. 1.

The framework 15 for the end wall 19, see FIGS. 2, 3, and 6, includes uprights 113 one on each side of the port 22. The cutter-supporting forks 79 include extensions 114 extending between the uprights 113 which are provided with guides 115 engageable therewith to prevent any lateral displacement of the cutters 81. The extensions 114 also serve to support splitting shoes, generally indicated at 115, which spread the cut insulation and ride on the cores of the cables 21 close to the appropriate cutter 81 and hence ensure the correct cutting depth.

Each splitting shoe 115, see FIGS. 6, 7, and 8, is shown as consisting of mirror sections 115A and 115B secured together by countersunk screws 116. The shoe has a central pocket 117 opening through the point 118, the pocket being V-shaped in cross section to closely fit but freely receive the bevelled edge portion 81A of a cutter 81 and is also arcuate, longitudinally considered to receive that portion of the cutter just rearwardly of the point of the maximum depth of its cut. Each shoe is of a height approximately equal to that of the thickest insulation that can be cut. Each shoe has outer wing surfaces 119 that are both inclined outwardly both rearwardly and away from the associated cutter 81, substantially parallel to the proximate face of its edge portion 81A with its point 118 substantially narrower than the thickness of the cutter 81 inwardly of its bevelled edge. Desirably, the point 118 is spaced relative to the associated cutter 81 to ride close to the core of the cable. The shoes may be positioned slightly above or slightly below the cutting edge. In the latter case, the shoes effectively split any remaining uncut portion of the insulation.

In practice, the cable feed is adjusted to space the chains 50 apart to receive the cable 21 between them and grip it sufficiently tightly to ensure that it is advanced to the cutters 81 which are spaced apart as required to ensure that the insulation is severed by each of them. Suitable adjustable supports may be employed at the infeed port 20 to facilitate the centering of the introduced cable length. It is preferred that the rate at which the cutters 81 are rotated is such as to provide a peripheral speed greater than the rate of travel of the cable. While with short cable lengths, a high rate of cable travel is not advantageous, the machine described is capable of speeds well in excess of two hundred feet per minute so that long cable lengths can be processed as rapidly as the stripped core and the insulation sections can be handled at the outfeed end of the machine.

It is also preferred that the cutters 81 engage the cable 21 close to but rearwardly of the outfeed ends of the chains 50, i.e., just as the cable-deforming pressure is released.

The cable 21 is a common type while the cable 121, see FIG. 9 is a typical telephone cable having a thin lead sheathing 124A. The cable 221, see FIG. 10, is shown as of a type in which its insulation 224 is thick.

We claim:

1. A machine for stripping insulation from a cable, said machine comprising supporting structure, a pair of spaced, rotatable cutting members, means to rotate said cutting members, adjustable means connecting said cutting members to said structure in a plane and operable to move said cutting members equally towards and away from each other, and a feed to advance a cable to said cutting members and including a pair of spaced, cable-gripping means and means connecting said cable-gripping means to said structure, one on each side of said plane and operable to move said cable-gripping means equally towards and away from each other in a second plane intersecting said first plane at right angles midway between said cutters thereby to enable cables within a predetermined size range to be received and a gripping pressure applied thereto that ensures positive advance of the cable, and means to drive said cable-gripping means to feed said cable, each of said cable-gripping means including a pair of sprockets spaced lengthwise of the machine in said second plane, and a cable-engaging chain trained about said sprockets, and said cutting members located in a zone between a first transverse line inclusive of the axes of the two sprockets adjacent the outfeed end of the chains and a second transverse line tangent to the two chains where trained about said two sprockets.

2. The machine of claim 1 and stripping shoes, one for each cutting member and supported by the adjustable means therefor in a position for initial engagement with the insulation where it is being cut.

3. The machine of claim 1 in which the cutting members are rotatable cutters and the machine includes a cutter rotating drive and shoes, one for each cutter and attached to the supporting means therefor rearwardly thereof and including side portions disposed to receive the rear portion of the cutter between them and spread the proximate margins of the severed insulation sections away from each other.

4. The machine of claim 3 in which the drive for the cutters provides a rate of rotation of the cutters such that their peripheral speed is greater than the rate of advance provided for the cable by the cable feed.

5. The machine of claim 3 in which the cable feed and the drive for the cutters include a common electric motor.

6. The machine of claim 3 in which each shoe is disposed relative to the associated cutter to ride along the core of the cable and maintain that cutter out of contact therewith and includes a point operable to split any unsevered insulation between it and said core.

7. The machine of claim 3 in which the cutter rotating drive includes a pair of aprallel transverse shafts, one for each cutter, a sprocket fast on each shaft, a hub mounted on each shaft for rotation independently thereof and including a forked arm, each cutter includes a shaft supported by said forked arm and provided with a sprocket, a chain trained about the appropriate transverse and cutter shafts sprockets, and means to rotate said parallel shafts equally but oppositely.

8. The machine of claim 7 in which the means rotating the parallel shafts includes a connection with the drive for the cable-gripping means.

9. The machine of claim 3 in which each cutter has a bevelled cutting edge and a shoe for each cutter is attached to the supporting means therefor, each shoe having a point of a width substantially less than the thickness of the cutter inwardly of said edge and having a central recess opening through and dividing said point, the cross sectional shape of the recess being such as to freely but closely receive that portion of the cutter that is just rearwardly of the point of its maximum penetration into the cable, each shoe also having a wing surface inclined outwardly both rearwardly of and away from the proximate face of the associated cutter.

10. The machine of claim 9 in which the shoe is positioned relative to the associated cutter to ride on the core of the cable being stripped to maintain the cutter out of contact therewith.

11. The machine of claim 1 in which the position of thee cutting member is close to said first transverse line.

12. The machine of claim 1 in which the cutting members are located to attack the insulation as the cable is freed of gripping pressure.

13. The machine of claim 1 and stripping shoes, one for each cutting member and supported by the adjustable means therefor, said shoes being located close to but rearwardly of the penetration of the insulation by the cutting members.

14. The machine of claim 1 in which the means connecting the cable-gripping means to the structure includes a carriage for each of the cable-gripping means, means mounting said sprockets on said carriages, and rotatable members common to both carriages and including oppositely threaded connections therewith.

15. The machine of claim 14 in which the carriages are positioned below the path of the largest cable that can be accommodated between the cable-gripping means and the sprocket and supporting the sprockets in the second named plane.

16. The machine of claim 15 in which the drive for the cable-gripping means includes a gear on one sprocket-supporting shaft of each carriage and the drive for the cable-gripping means includes a transverse shaft below the carriages, a first vertical shaft for each carriage and driven by said transverse shaft, a second vertical shaft for each carriage and supported by th e mounting means thereof and provided with a gear in mesh with the gear on said one sprocket-supporting shaft, and universal joints between the first and second vertical shafts for both carriages.

17. The machine of claim 14 in which the sprocket-mounting means for the sprockets include a separate mount for each sprocket and at least one pair of tranversely aligned mounts has a connection with the carriage adjustable to enable that pair of transversely aligned mounts to be spaced apart differently than the other pair thereof.

18. The machine of claim 1 in which the adjustable means for the cutting members includes a pair of arms, one for each and in support thereof, a transverse pivoted connection between one end of each arm and the structure thereby enabling the arms to swing towards and away from each other, toggle joints connecting each arm to said structure and disposed to control said swinging arm movements, adjustable actuating means connected to a central portion of each toggle joint, and common means connected to said actuating means and operable to effect their equal adjustment.

19. The machine of claim 18 in which the cutting members are rotatable cutters, the common means comprises a pair of parallel shafts, means interconnect said shafts so that they turn together, each of said actuating means includes an arm connected at one end to the appropriate toggle joint, a support to which the other end thereof is pivotally connected and a shaft threaded in said support, and each of said threaded shafts being connected to the appropriate one of said parallel shafts to be rotated thereby to move said support axially relative to its threaded shaft.

20. The machine of claim 1 in which the adjustable means for the cutting members include arms pivotally connected to the supporting structure adjacent the infeed end of the machine and arm guides adjacent the outfeed end of the machine hold the arms to prevent movement of said cutting members out of said first named plane.

21. The machine of claim 20 and a stripping shoe carried by each arm rearwardly of the cutting member supported by that arm.

* * * * *